D. KIHLGREN.
CREAM COOLER.
APPLICATION FILED APR. 18, 1910.
978,458.
Patented Dec. 13, 1910.
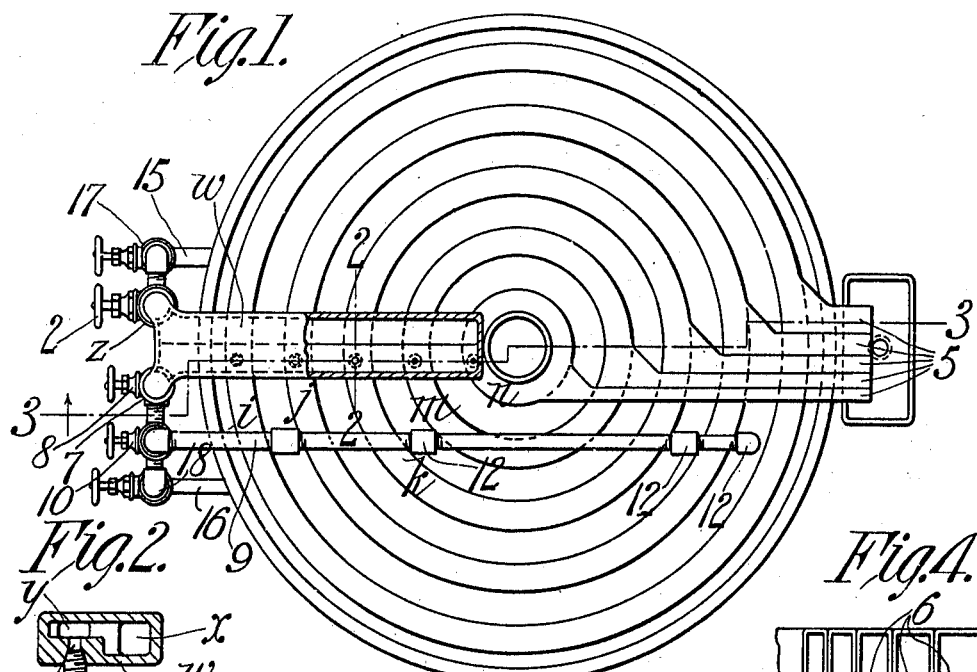
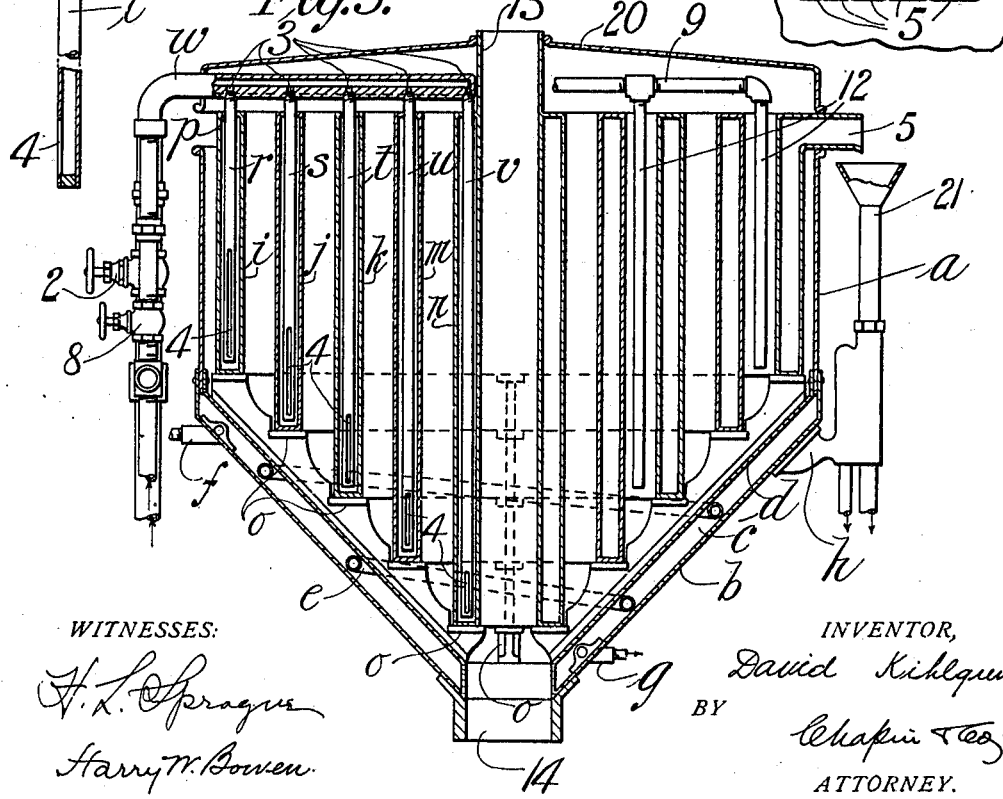
WITNESSES:
H. L. Sprague
Harry W. Bowen
INVENTOR,
David Kihlgren,
BY
Chapin & Co.
ATTORNEY.

UNITED STATES PATENT OFFICE.

DAVID KIHLGREN, OF SPRINGFIELD, MASSACHUSETTS, ASSIGNOR TO THE CONFECTIONERS' MACHINERY & MANUFACTURING COMPANY, OF SPRINGFIELD, MASSACHUSETTS, A CORPORATION.

CREAM-COOLER.

978,458.

Specification of Letters Patent. Patented Dec. 13, 1910.

Application filed April 18, 1910. Serial No. 556,098.

*To all whom it may concern:*

Be it known that I, DAVID KIHLGREN, a citizen of the United States of America, residing at Springfield, in the county of Hampden and State of Massachusetts, have invented new and useful Improvements in Cream-Coolers, of which the following is a specification.

This invention relates to improvements in cream coolers and is particularly designed for use in connection with the cooling of cream which is used in the manufacture of confections or chocolates.

The objects of the invention are,—(1) To provide an apparatus that will rapidly and thoroughly cool a large body of cream or other analogous substance in a short space of time; (2) to provide means for quickly and thoroughly cleansing the cooling apparatus when required; (3) to provide means for causing the cooling substance or medium, as flowing water, to be equally distributed so that the entire body or volume of cream may be cooled at the same time, whereby the temperature of the whole mass of cream is simultaneously reduced to the same degree; (4) to provide means whereby the cooling medium may be discharged from the cooler at the same level; (5) to provide means whereby the individual cooling elements or compartments may be separately removed from the main cooling tank or receptacle; (6) to provide means for causing the cooling medium to be discharged as a thin layer or sheet against the sides of the compartments containing the cream.

In the drawings forming part of this application,—Figure 1 is a plan view of the apparatus showing the cooling and cream compartments, the piping construction for supplying the cooling and cleaning mediums, and the discharge outlets for the cooling medium. Fig. 2 is a transverse section on line 2—2, Fig. 1, showing the construction whereby the cooling medium is caused to overflow evenly or uniformly into all of the cooling compartments. Fig. 3 is a sectional view on the line 3—3, Fig. 1, showing the detail construction and arrangement of the inlet pipes for conveying the cooling medium, the discharge spout for one of the cooling sections, the cream compartments, and the jacket at the lower portion of the receptacle. Fig. 4 is an end view of the discharge spouts for the cooling medium showing said medium issuing at the same level from all of the spouts.

Referring to the drawings in detail, $a$ designates the main casing or cream receptacle, the bottom portion of which is inclined, as shown at $b$.

$c$ designates a jacket construction or space between the outer part $b$ and the inner part $d$ for receiving the steam-coils $e$, and also for receiving the cooling medium. The inlet and outlet ends of the steam coils are shown at $f$ and $g$. The steam pipes are used when it is desired to heat the cream. The jacket construction or space $c$ is filled with running water when it is desired to cool the cream in this portion of the receptacle. The discharge outlet for the water is shown at $h$.

$i, j, k, m$ and $n$ designate a series of circular cooling compartments which are arranged in a concentric relation with each other. These compartments are of different depths and, as shown, rest on the supporting ledges or steps $o$ in the bottom of the receptacle $a$. The tops of these compartments are closed, as shown at $p$, and passing through the top portion of each compartment are depending inlet pipes $r, s, t, u,$ and $v$, which are connected to a casting or header element $w$, a transverse section of which is shown in Fig. 2, and through one of the depending pipes.

$x$ designates the inlet side of the header, and $y$ the outlet or overflow side, and it will be noticed that the inlet side or compartment $x$ is larger than the outlet side. The purpose of this construction is to allow the cooling water or other medium to enter through the pipe $z$ which is controlled by means of a suitable valve 2.

The cooling medium will flow into the channel $x$ to the inner end of the header element $w$ and will then simultaneously overflow into all of the depending pipes $r, s, t, u,$ and $v$ through the respective openings 3; and, as stated above, it will be noticed that these inlets are of different areas, the reason of which is that the various cooling compartments being of greater diameter, a larger volume of the cooling medium is required. The lower end of each of the said depending pipes is provided with a slit 4, and it will be observed that these slits are also of different lengths, whereby a larger volume of water will be discharged into the various cooling compartments, and as the water issues from these slits in a sheet-like form, in a direction parallel with the walls of the cooling compartments, it will immediately set up a rotary or circular movement of the cooling medium in these compartments toward the outlets. In practice, these slits may be arranged so that they face in opposite directions whereby the cooling medium will flow in opposite directions in the various compartments $i$, $j$, $k$, $m$ and $n$. The discharge outlets for these various compartments are shown in plan view, Fig. 1, at 5, and it will be noticed that these discharge outlets or spouts vary in size, the largest one forming the outlet for the outer compartment, and the smaller one the outlet for the inner. It will also be noticed that the cooling medium and the discharge outlets all stand in the same horizontal plane, as indicated at 6, in Fig. 4.

7 designates a pipe that extends up the side of the receptacle $a$ and is connected with a suitable source of steam pressure which is controlled by means of a valve 8, whereby when the valve 2 is closed and the valve 8 is opened steam may be permitted to flow into the various compartments for cleansing or heating purposes, as desired. Attached to the steam-pipe 7, is a pipe 9 which is controlled by means of a valve 10. This pipe 9 extends transversely over the top of the receptacle $a$ and is provided with a series of depending pipes 12 which enter the annular cream spaces between the cooling compartments. These depending pipes 12 are used for cleansing or washing the cream from the sides of the cooling compartments when the valve 2 is closed and when the valves 8 and 10 are opened, thus allowing steam to enter and thoroughly cleanse the sides of the cooling compartments: Or, if it is desired, the valve 8 many be closed and the valves 2 and 10 opened, allowing water to enter by means of the depending pipes 12 and the connecting pipe 9: Or, if desired, the steam and the water may be allowed to enter together.

The cream is introduced into the receptacle by means of the centrally arranged tubular member 13, and flows out at the bottom thereof, and then upward into the space between the cooling members $i$, $j$, $k$, $m$ and $n$. The discharge outlet for the cream is shown at 14, and is controlled by a suitable gate.

The jacket $c$ is provided with the pipes 15 and 16 that are controlled by means of valves 17 and 18, in order to permit water or steam from the pipes $z$ and 7 to enter this jacket compartment, either for the purposes of cooling or for the heating of the cream in the bottom part of the receptacle.

A suitable cover for the receptacle is shown at 20, and a funnel element at 21 for the discharge of the cooling medium.

What I claim, is:—

1. In a cream-cooling apparatus, the combination with a cream-receiving receptacle, of a plurality of concentrically arranged cooling members therein, a plurality of depending pipes extending into said members and having an outlet slit in the lower portions thereof, means for supplying a cooling medium to the pipes, each of the compartments having a discharge outlet arranged in the same horizontal plane, substantially as described.

2. In a cream-cooling apparatus, the combination with a receptacle, of a plurality of cooling members located within the receptacle, a plurality of inlet members for conveying the cooling medium to the interior of the cooling members, and a discharge outlet for each of said members, and means for supplying the cooling medium to the inlet members.

3. In a cream-cooling apparatus, the combination with a receptacle, a plurality of cream-cooling members, a depending pipe entering each of said members, a header to which the pipes are connected, the header being so constructed that a simultaneous overflow therefrom into each of the pipes is effected, and means for supplying a cooling medium to the header, each of said cooling members having a discharge outlet and arranged in the same horizontal plane.

4. In a cream cooling apparatus, means for supplying the cooling medium with a plurality of cooling members, said members being provided with an outlet for each of said members, and pipe connections for furnishing a cooling medium to either the interior or exterior portions of the cooling members.

DAVID KIHLGREN.

Witnesses:
K. S. CLEMONS,
HARRY W. BOWEN.